United States Patent
Tagami

(10) Patent No.: US 12,233,966 B2
(45) Date of Patent: Feb. 25, 2025

(54) ELECTRIC POWER STEERING DEVICE, CONTROL DEVICE FOR ELECTRIC POWER STEERING DEVICE, AND PROGRAM

(71) Applicant: Hitachi Astemo, Ltd., Hitachinaka (JP)

(72) Inventor: Kyoichi Tagami, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 228 days.

(21) Appl. No.: 18/152,491

(22) Filed: Jan. 10, 2023

(65) Prior Publication Data

US 2023/0159093 A1    May 25, 2023

Related U.S. Application Data

(63) Continuation of application No. PCT/JP2020/031825, filed on Aug. 24, 2020.

(51) Int. Cl.
*B62D 5/04* (2006.01)
*B60W 40/076* (2012.01)
*B62D 5/22* (2006.01)
*B62D 6/04* (2006.01)

(52) U.S. Cl.
CPC ......... *B62D 5/0463* (2013.01); *B60W 40/076* (2013.01); *B62D 5/22* (2013.01); *B62D 6/04* (2013.01)

(58) Field of Classification Search
CPC .......... B62D 5/0463; B62D 5/22; B62D 6/04; B62D 6/008; B60W 40/076
USPC ......................................... 701/41, 42, 43, 44
See application file for complete search history.

(56) References Cited

U.S. PATENT DOCUMENTS

| | | | |
|---|---|---|---|
| 9,045,157 | B2 * | 6/2015 | Tamaizumi .............. B62D 6/04 |
| 10,723,380 | B2 * | 7/2020 | Pursifull ................. B62D 6/10 |
| 2014/0238769 | A1 | 8/2014 | Tamaizumi et al. | |

FOREIGN PATENT DOCUMENTS

| | | |
|---|---|---|
| JP | 2011025845 A | 2/2011 |
| JP | 2013112254 A | 6/2013 |
| JP | 2014162420 A | 9/2014 |
| JP | 2015186955 A | 10/2015 |
| JP | 2017177950 A | 10/2017 |
| JP | 2019084944 A | 6/2019 |

OTHER PUBLICATIONS

International Search Report mailed Oct. 13, 2020 for the corresponding International Patent Application No. PCT/JP2020/031825 (6 pages including English translation).
Japanese Office Action mailed Oct. 6, 2020 for the corresponding Japanese Patent Application No. 2020-544875 (8 pages including English translation).

* cited by examiner

*Primary Examiner* — Hai H Huynh
(74) *Attorney, Agent, or Firm* — Leason Ellis LLP; Edward J. Ellis; Melvin C. Garner

(57) ABSTRACT

An electric power steering device 100 includes: an electric motor 110 configured to apply a driving force to steer a wheel in response to operation of a steering wheel; and a control device 10 configured to perform control of drive of the electric motor by estimating a degree of sloping in a transverse direction of a roadway on which a vehicle travels, determining, based on the estimated degree of sloping, a correction current for correcting a target current required for the electric motor to generate the driving force, and correcting the target current with the correction current.

9 Claims, 16 Drawing Sheets

ELECTRIC POWER STEERING DEVICE, CONTROL DEVICE FOR ELECTRIC POWER STEERING DEVICE, AND PROGRAM

CROSS REFERENCE TO RELATED APPLICATIONS

This application is a Continuation of International Patent Application No. PCT/JP2020/031825 filed on Aug. 24, 2020, the content of which is incorporated herein by reference in its entirety.

FIELD OF THE INVENTION

The present invention relates to an electric power steering device, a control device for an electric power steering device, and a program.

BACKGROUND ART OF THE INVENTION

In recent years, electric power steering devices have been proposed that include an electric motor in a vehicle steering system and assist a driver's steering force with the power from the electric motor to steer the wheels.

It is also known that if a roadway for vehicles is inclined in a transverse direction, so-called vehicle body drifting occurs as the vehicle travels. Thus, techniques have been proposed to reduce such vehicle body drifting using an electric power steering device.

For example, Japanese Patent Application Laid-Open Publication No. 2017-177950 discloses a control device of an electric power steering device including an electric motor that provides an assist force for steering of a steering wheel of a vehicle, a steering angle sensor that detects a steering angle of the steering wheel, and the control device. The control device performs normal control of controlling the driving force of the electric motor based on steering torque of the steering wheel. Also, the control device corrects the driving force according to a steering angle deviation between an estimated steering angle estimated based on a rotation speed of the wheels of the vehicle and a detected steering angle detected by a steering angle detector such that the driving force is greater than the driving force during the normal control when the steering wheel is in a held state where the steering wheel is being held in a position other than a neutral position. On the other hand, the control device does not correct the driving force during a steering operation where the steering wheel is being steered to turn the vehicle.

CITATION LIST

Patent Literature

Patent Literature 1: Japanese Patent Application Laid-Open Publication No. 2017-177950

Technical Problem

However, conventional techniques correct the driving force of the electric motor using a steering angle of a steering member or the like. As such, conventional techniques do not take into account actual state quantities of the vehicle and may degrade the steering feel for the driver.

An object of the present invention is to provide an electric power steering device that corrects the driving force of the electric motor by taking into account state quantities of the vehicle to thereby improve the steering feel for the driver.

SUMMARY OF THE INVENTION

Solution to Problem

To achieve the above object, an aspect of the present invention provides an electric power steering device including: an electric motor configured to apply a driving force to steer a wheel in response to operation of a steering wheel; and a control unit configured to perform control of drive of the electric motor by estimating a degree of sloping in a transverse direction of a roadway on which a vehicle travels, determining, based on the estimated degree of sloping, a correction current for correcting a target current required for the electric motor to generate the driving force, and correcting the target current with the correction current.

Another aspect of the present invention provides a control device for an electric power steering device, the control device including: a slope estimator configured to estimate a degree of sloping in a transverse direction of a roadway on which a vehicle travels; a correction current determiner configured to determine, based on the estimated degree of sloping, a correction current for correcting a target current required for an electric motor to generate a driving force; and a target current determiner configured to determine the target current based on the determined correction current.

Advantageous Effects of Invention

The present invention can provide an electric power steering device that corrects the driving force of the electric motor by taking into account state quantities of the vehicle to thereby the improve steering feel for the driver.

DETAILED DESCRIPTION OF THE INVENTION

Exemplary embodiments of the present invention will be described below in detail with reference to the appended drawings.

<Description of the Entire Electric Power Steering Device>

Figure 1:
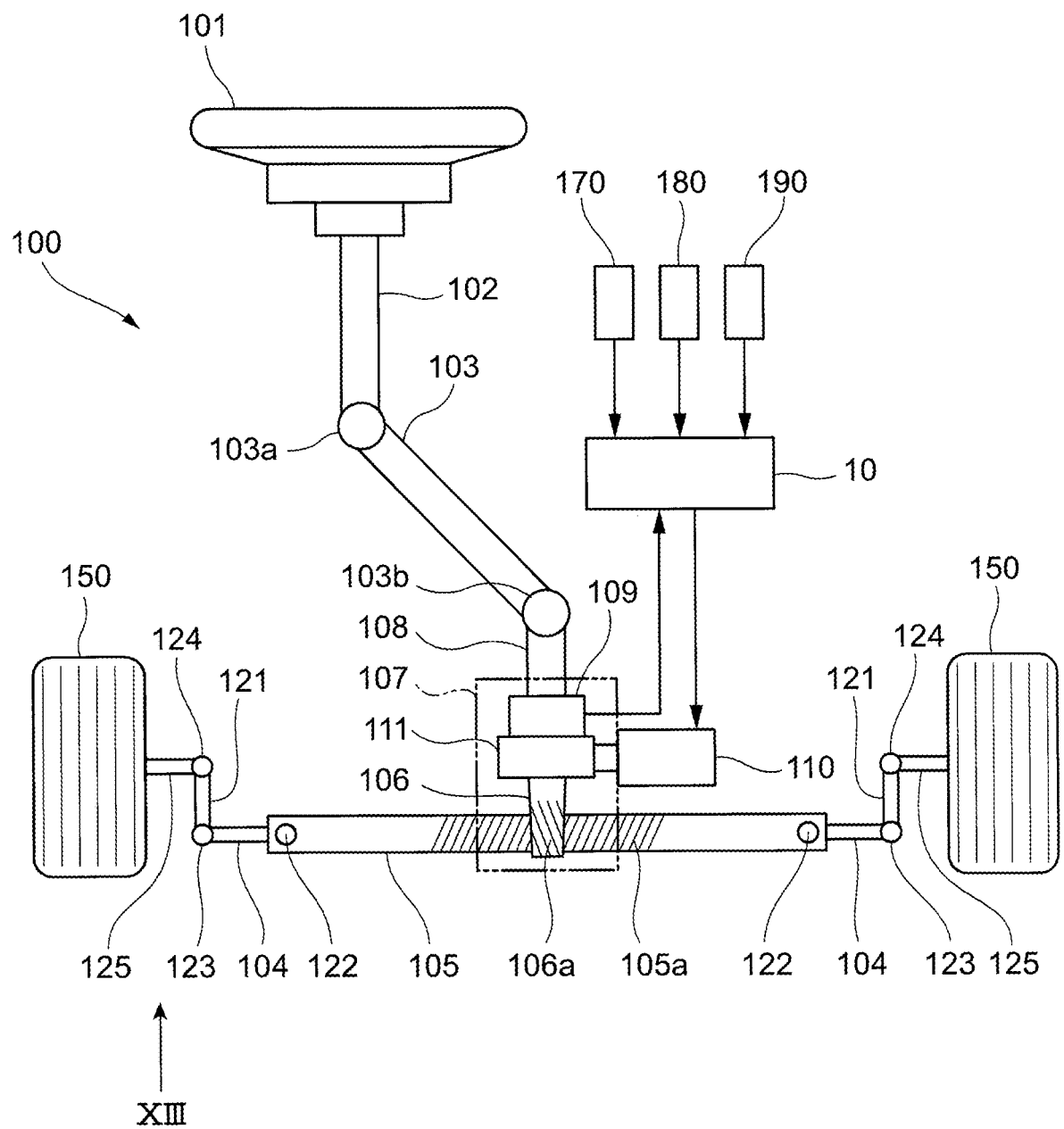
FIG. 1 illustrates a schematic configuration of an electric power steering device according to exemplary embodiments.

FIG. 1 illustrates a schematic configuration of the electric power steering device 100 according to the exemplary embodiments.

The electric power steering device 100 (which may hereinafter be simply referred to as a "steering device 100") is a steering device to change a traveling direction of a vehicle to any direction. In the present embodiments, the steering device 100 is illustrated as being used in an automobile.

The steering device 100 includes a steering wheel 101 in the form of a wheel operated by a driver and a steering shaft 102 integral with the steering wheel 101. The steering shaft 102 is coupled with an upper coupling shaft 103 via a universal joint 103a. The upper coupling shaft 103 is coupled with a lower coupling shaft 108 via a universal joint 103b.

The steering device 100 further includes knuckle arms 121 and steering knuckles 125 coupled with respective right and left wheels 150 as rolling wheels and each rotatable around a corresponding kingpin 124. The steering device 100 further includes tie rods 104 coupled with the respective knuckle arms 121 and a rack shaft 105 coupled with the tie rods 104. The knuckle arm 121 and the tie rod 104 are joined such that they are rotatable around a corresponding joint 123. Also, the tie rods 104 and the rack shaft 105 are joined such that they are rotatable around respective joints 122.

The steering device 100 further includes a pinion 106a that constitutes a rack and pinion mechanism with rack teeth 15a formed on the rack shaft 15. The pinion 106a is formed on a lower end of a pinion shaft 106.

The steering device 100 further includes a steering gearbox 107 containing the pinion shaft 106. Within the steering gearbox 107, the pinion shaft 106 is coupled with the lower coupling shaft 108 via a torsion bar. A torque sensor 109 is located within the steering gearbox 107. The torque sensor 109 detects steering torque T of the steering wheel 101 based on a relative angle between the lower coupling shaft 108 and the pinion shaft 106.

The steering device 100 further includes an electric motor 110 supported by the steering gearbox 107, and a reducer mechanism 111 that transmits the driving force of the electric motor 110 at a reduced speed to the pinion shaft 106. The electric motor 110 according to the present embodiments is a three-phase brushless motor. The magnitude and direction of an actual current flowing in the electric motor 110 is detected by a motor current detector 33 (see FIG. 3).

The steering device 100 includes a control device 10 that controls the operation of the electric motor 110. The control device 10 receives a torque signal Td, which is an output value from the torque sensor 109 described above, a vehicle speed signal v, which is an output value from a vehicle speed sensor 170 for detecting a vehicle speed Vx representing a moving speed of the vehicle, a lateral acceleration signal Gy, which is an output value from a lateral acceleration sensor 180 for detecting lateral acceleration $G_{ySens}$ representing acceleration in the lateral direction of the vehicle, and a yaw rate signal γs, which is an output value from a yaw rate sensor 190 for detecting a yaw rate γ of the vehicle. In the present embodiments, the control device 10 serves as a control unit (control device for electric power steering devices) to perform control of the drive of the electric motor 110. As described in detail below, the control device 10 estimates a degree of sloping in the transverse direction of the roadway and controls the drive of the electric motor 110 according to the estimated degree of sloping.

The steering device 100 configured as described above uses the torque sensor 109 to detect the steering T applied to the steering wheel 101, drives the electric motor 110 according to the detected torque, and transmits the torque generated from the electric motor 110 to the pinion shaft 106. Thus, the torque generated from the electric motor 110 assists the driver's steering force applied to the steering wheel 101. In other words, the electric motor 110 generates an assist force as a driving force to steer the wheels 150 in response to the operation of the steering wheel 101. The assist force is applied to the wheels 150 via the rack shaft 105 that transmits the assist force.

<Description of the Control Device 10>

The control device 10 is now described.

Figure 2:
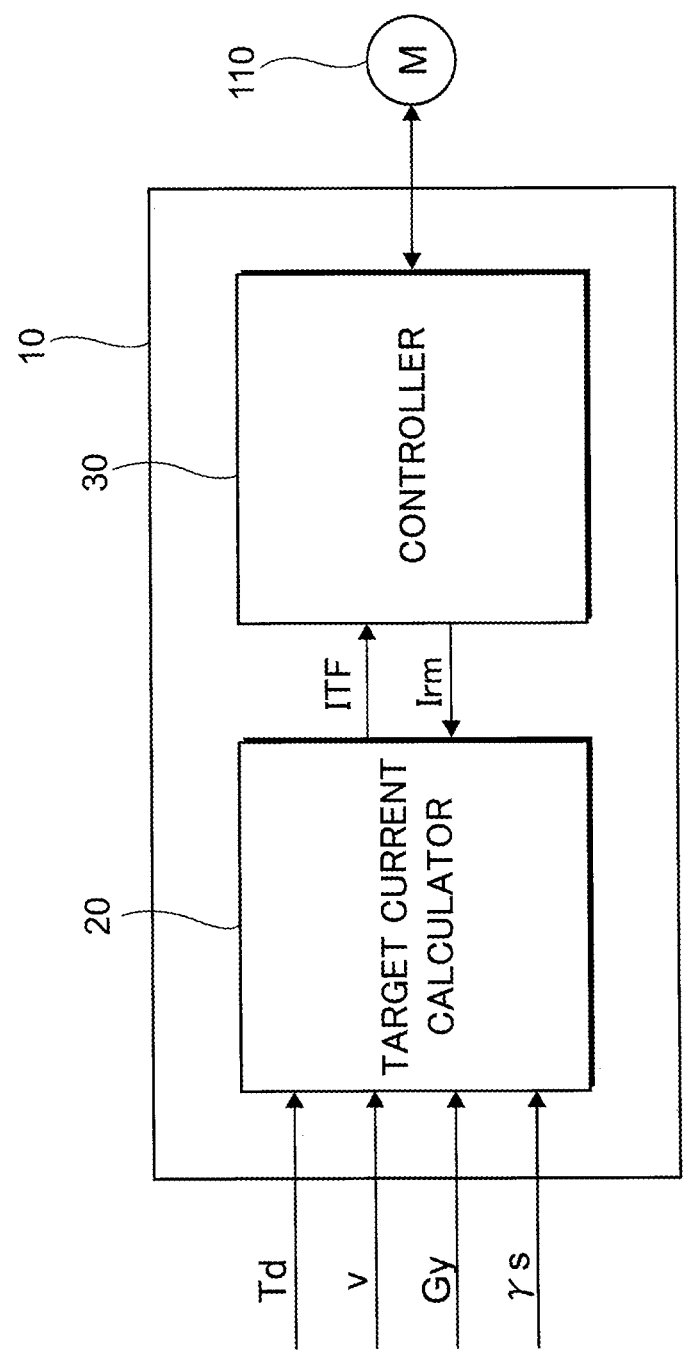
FIG. 2 illustrates a schematic configuration of a control device of the steering device.

FIG. 2 illustrates a schematic configuration of the control device 10 of the steering device 100.

The control device 10 is an arithmetic logic circuit consisting of a CPU, ROM, RAM, backup RAM, and other components.

The control device 10 receives the torque signal Td, which is an output signal converted from the steering torque T detected by the torque sensor 109 described above, the vehicle speed signal v, which is an output signal converted from the vehicle speed Vx detected by the vehicle speed sensor 170 according to the vehicle speed, the lateral acceleration signal Gy, which is an output signal converted from the lateral acceleration $G_{ySens}$ detected by the lateral acceleration sensor 180 according to the acceleration in the lateral direction of the vehicle, and the yaw rate signal γs, which is an output signal converted from the yaw rate γ detected by the yaw rate sensor 190 according to the rotational speed of the vehicle. The yaw rate γ represents a rotational speed around the vertical axis passing through the center of gravity of the vehicle.

The control device 10 includes a target current calculator 20 and a controller 30. The target current calculator 20 calculates target torque based on the torque signal Td and calculates a target current required for the electric motor 110 to supply this target torque. The controller 30 performs various types of control, such as feedback control based on the target current calculated by the target current calculator 20.

<Description of the Target Current Calculator 20 and the Controller 30>

The target current calculator 20 and the controller 30 are now described in detail.

Figure 3:
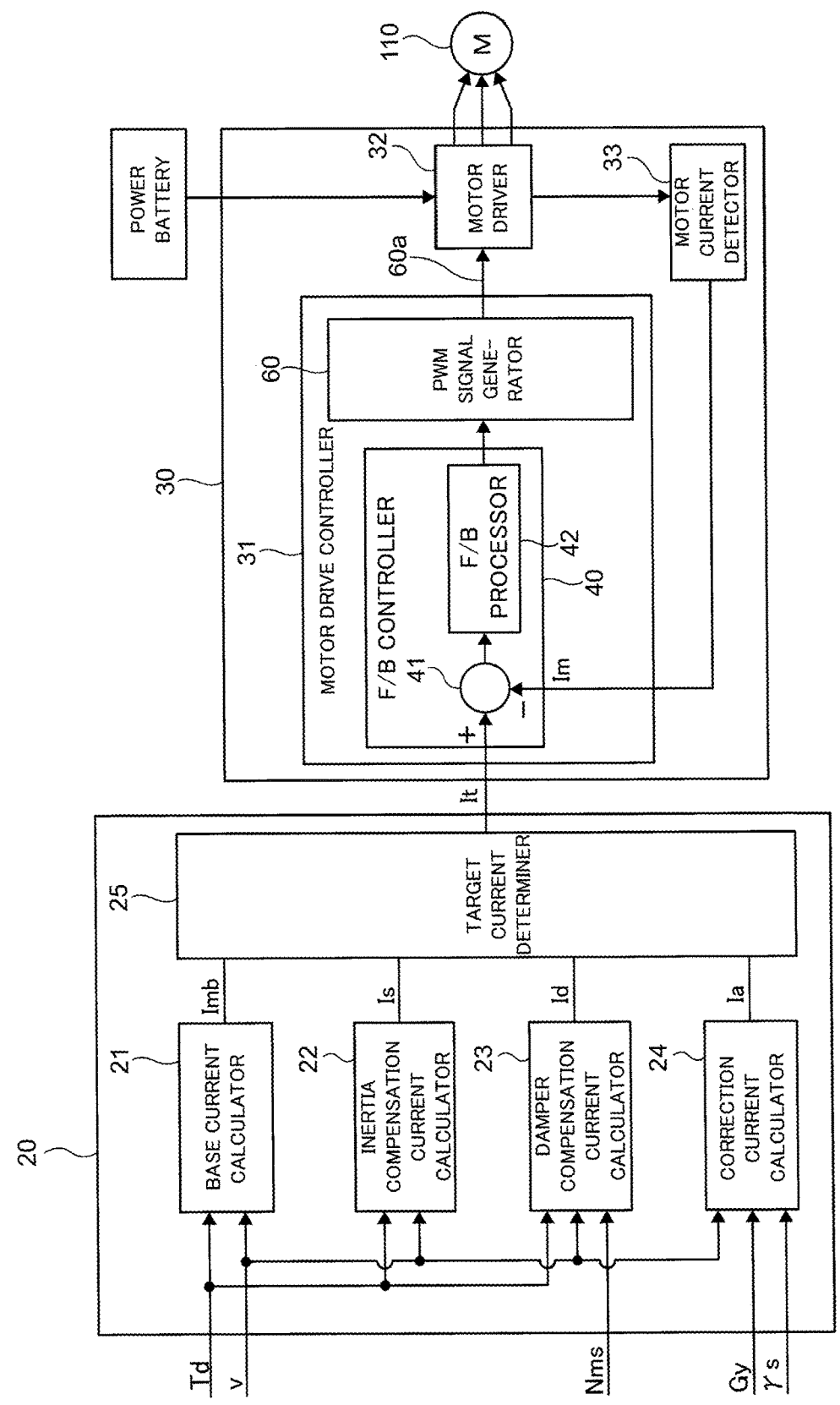
FIG. 3 illustrates schematic configurations of a target current calculator and a controller.

FIG. 3 illustrates schematic configurations of the target current calculator 20 and the controller 30.

The target current calculator 20 includes: a base current calculator 21 that calculates a base current Ib on which the setting of the target current is based; an inertia compensation current calculator 22 that calculates an inertia compensation current to overcome the moment of inertia of the electric motor 110; a damper compensation current calculator 23 that calculates a damper compensation current to limit the rotation of the motor; and a correction current calculator 24 that calculates a correction current Ia to correct the target current. The target current calculator 20 further includes a target current determiner 25 that determines a target current It based on the values calculated by the base current calculator 21, the inertia compensation current calculator 22, the damper compensation current calculator 23, and the correction current calculator 24.

The target current calculator 20 receives signals including the torque signal Td, the vehicle speed signal v, the lateral acceleration signal Gy, the yaw rate signal γs, and a rotational speed signal Nms, which is an output signal converted from a rotational speed Nm of the electric motor 110.

The base current calculator 21 calculates the base current Ib based on the torque signal Td and the vehicle speed signal v from the vehicle speed sensor 170, and outputs a base current signal Imb that includes information about this base current Ib.

The inertia compensation current calculator 22 calculates, based on the torque signal Td and the vehicle speed signal v, the inertia compensation current to overcome the moment of inertia of the electric motor 110 and the system, and outputs an inertia compensation current signal Is that includes information about this current.

The damper compensation current calculator 23 calculates, based on the torque signal Td, the vehicle speed signal v, and the rotational speed signal Nms of the electric motor 110, the damper compensation current to limit the rotation of the electric motor 110, and outputs a damper compensation current signal Id that includes information about this current.

The correction current calculator 24 estimates the degree of sloping in the transverse direction of the roadway and determines a correction current Ia based on the estimated degree of sloping. The correction current calculator 24 is described below.

The target current determiner 25 determines a target current to be supplied to the electric motor 110. The target current determiner 25 determines the target current based on the base current signal Imb calculated by the base current calculator 21, the inertia compensation current signal Is calculated by the inertia compensation current calculator 22, the damper compensation current signal Id calculated by the damper compensation current calculator 23, and the correction current Ia calculated by the correction current calculator 24, and outputs a target current signal It that includes information about this target current.

The controller 30 includes: a motor drive controller 31 that controls the operation of the electric motor 110; a motor driver 32 that drives the electric motor 110; and a motor current detector 33 that detects an actual current actually flowing in the electric motor 110 and outputs an actual current detection signal Im to the motor drive controller 31.

The motor drive controller 31 includes a feedback (FB) controller 40 and a PWM signal generator 60. The feedback controller 40 performs feedback control based on a deviation between the target current finally determined by the target current calculator 20 (the value indicated by the target current signal It) and the actual current, as detected by the motor current detector 33, supplied to the electric motor 110 (the value indicated by the actual current detection signal Im). The PWM signal generator 60 generates a pulse width modulation (PWM) signal for driving the electric motor 110 in a PWM fashion.

The feedback controller 40 includes: a deviation calculator 41 that obtains the deviation between the target current finally determined by the target current calculator 20 and the actual current detected by the motor current detector 33; and a feedback (FB) processor 42 that performs a feedback process to eliminate the deviation.

First Embodiment

A method of determining the correction current Ia described above is now detailed. The description begins with a first embodiment of the method of determining the correction current Ia. In the first embodiment, the correction current calculator 24 estimates the degree of sloping in the transverse direction of the roadway from state quantities of the vehicle, and determines the correction current Ia based on the estimated degree of sloping.

<Description of the Correction Current Calculator 24>

Figure 4:
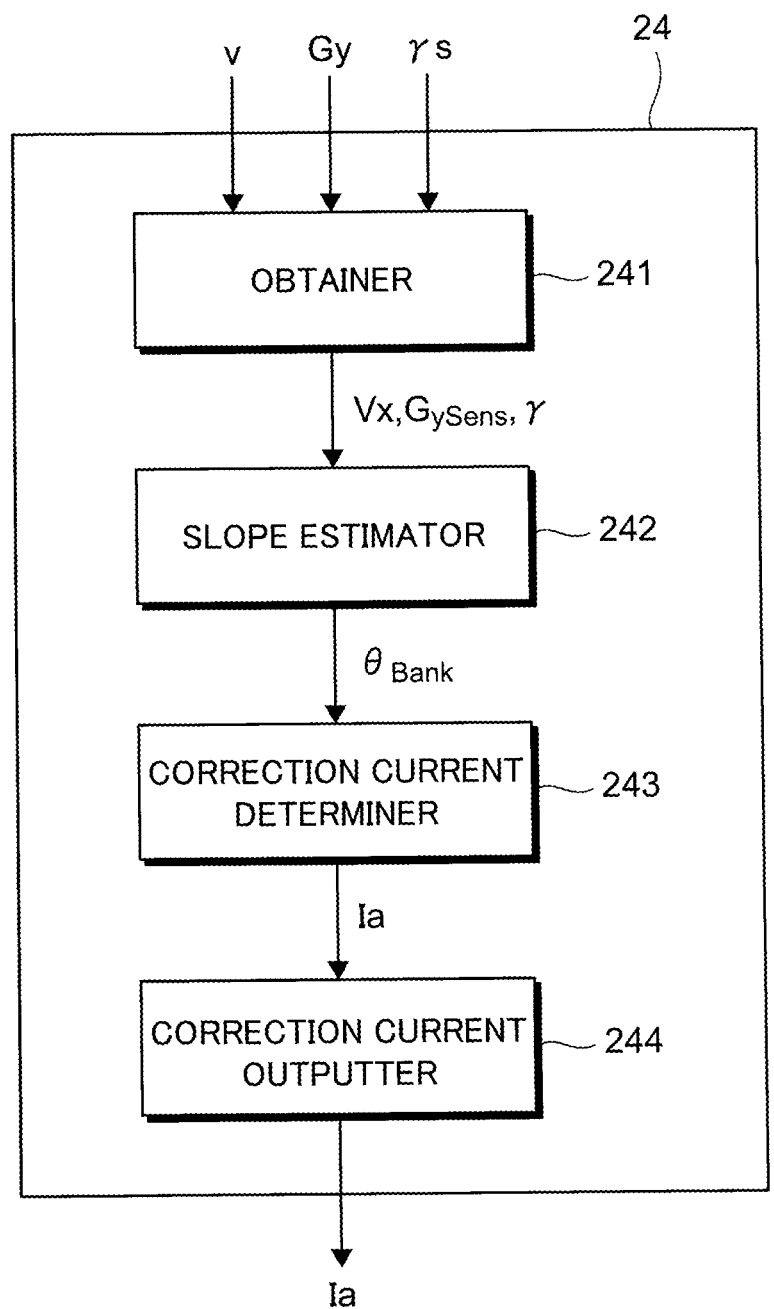
FIG. 4 is a block diagram illustrating an example functional configuration of a correction current calculator of a first embodiment.

FIG. 4 is a block diagram illustrating an example functional configuration of the correction current calculator of the first embodiment. As shown in the figure, the correction current calculator 24 includes an obtainer 241, a slope estimator 242, a correction current determiner 243, and a correction current outputter 244.

The obtainer 241 obtains the vehicle speed signal v from the vehicle speed sensor 170. The obtainer 241 also obtains the lateral acceleration signal Gy from the lateral acceleration sensor 180 and the yaw rate signal γs from the yaw rate sensor 190.

The slope estimator 242 estimates the degree of sloping in the transverse direction of the roadway based on a centripetal acceleration (lateral G) acting on the vehicle as the vehicle travels on the roadway. The "roadway" as used herein is a path on which vehicles travel, which is e.g., roads. The "transverse direction of the roadway" is a direction perpendicular to a direction in which the roadway extends. For example, the roadway may be sloped in this transverse direction because of the need to drain rainwater falling on the road surface into gutters or the like. For this reason, the cross-section of the roadway in the transverse direction may have a parabolic shape, which is elevated in the middle and lowers as one moves to the shoulders at both edges. The slope in the transverse direction of the roadway is sometimes called a transverse slope. The "degree of sloping" is an indicator of how gentle or steep the slope is. The degree of sloping is an angle of the slope, for example. However, this is not limiting, and any other indicator may be used to represent the degree of sloping. For example, the degree of sloping can be expressed on a 1-5 scale depending on the degree of sloping, in which case, for example, the degree "1" of sloping may indicate the smallest slope and the degree "5" of sloping may indicate the largest slope.

The slope estimator 242 estimates the degree of sloping in the transverse direction of the roadway from the vehicle speed Vx, the lateral acceleration $G_{ySens}$, and the yaw rate γ in the manner described below.

Figure 5:
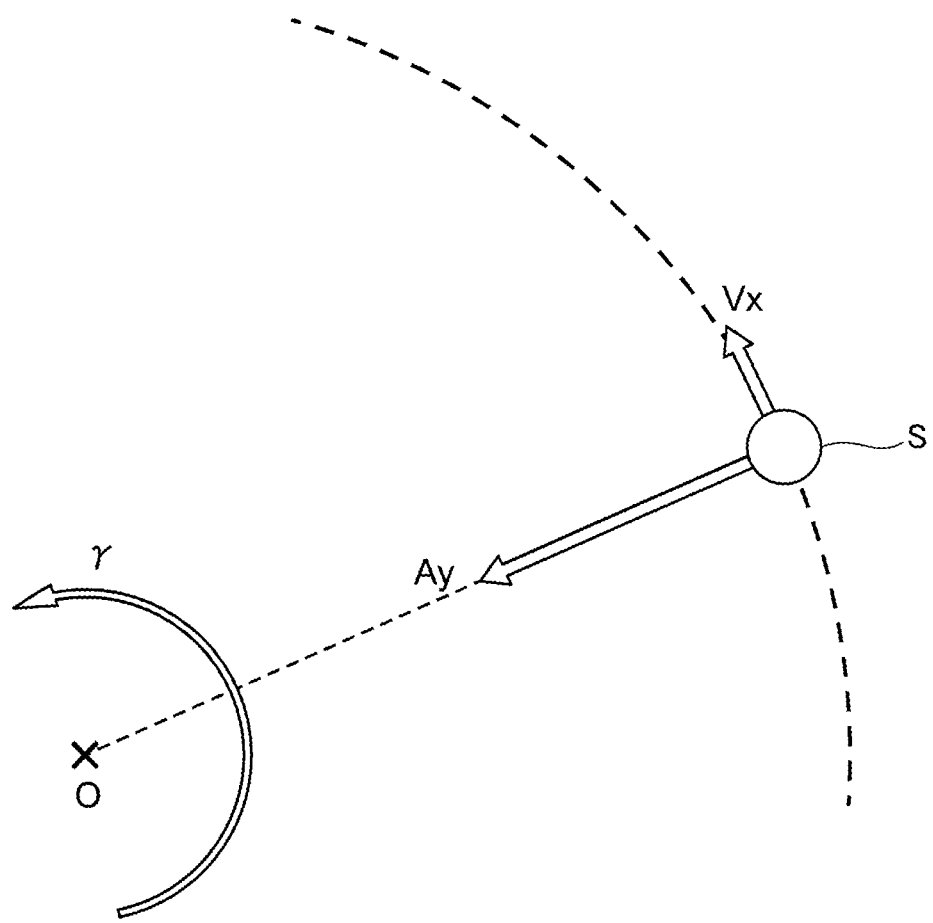
FIG. 5 explains centripetal acceleration acting on the vehicle.

FIG. 5 explains centripetal acceleration Ay acting on the vehicle.

Here, the vehicle S is assumed to be turning about the point O. In this case, the relationship between the vehicle speed Vx, the centripetal acceleration Ay, and the yaw rate γ can be expressed in the following equation (1). In other words, the slope estimator 242 calculates the centripetal acceleration Ay from the yaw rate γ acting on the vehicle and the vehicle speed Vx.

$$Ay = \gamma \cdot Vx \tag{1}$$

Figure 6:
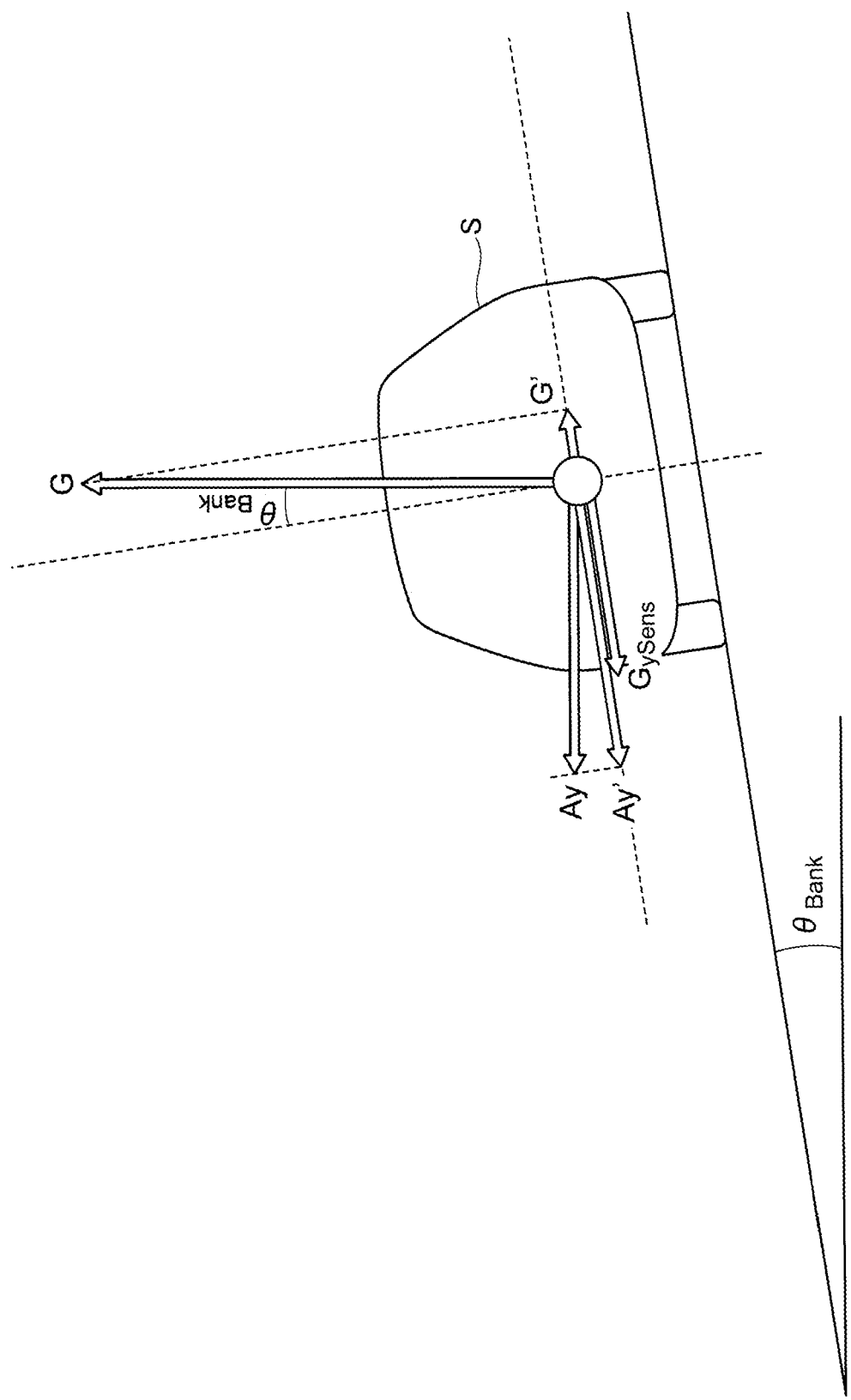
FIG. 6 explains various types of acceleration acting on the vehicle.

FIG. 6 explains various types of acceleration acting on the vehicle S.

Here, $\theta_{Bank}$ is a slope angle in the transverse direction of the roadway. The acceleration G is the gravitational acceleration. In addition, G' is a component generated under the influence of the gravitational acceleration G due to the roadway being sloped. Without any slope in the transverse direction of the roadway ($\theta_{Bank}=0$), the acceleration G' is 0. However, due to the roadway being sloped, the acceleration G' acting in the lateral direction of the vehicle S is apparently generated by the gravitational acceleration G.

In this case, the relationship between $\theta_{Bank}$, the acceleration G', and the gravitational acceleration G can be expressed in the following equation (2).

$$G'=G \cdot \sin(\theta_{Bank}) \quad (2)$$

Also, centripetal acceleration Ay' actually acting in the lateral direction of the vehicle can be expressed in the following equation (3). In other words, the lateral acceleration $G_{ySens}$ detected by the lateral acceleration sensor 180 is offset from the centripetal acceleration Ay' by the acceleration G', which is the component generated under the influence of the gravitational acceleration G.

$$Ay'=G_{ySens}-G' \quad (3)$$

When the slope angle $\theta_{Bank}$ in the transverse direction of the roadway is sufficiently small, the centripetal acceleration Ay and the centripetal acceleration Ay' are almost identical. Accordingly, the following equation (4) is established.

$$Ay' \approx Ay = \gamma \cdot Vx \quad (4)$$

Therefore, $\theta_{Bank}$ can be expressed in the following equation (5).

$$\theta_{Bank}=\sin^{-1}(G'/G) \approx \sin^{-1}((G_{ySens}-\gamma \cdot Vx)/G) \quad (5)$$

When the slope angle $\theta_{Bank}$ is sufficiently small, $\sin\theta \approx \theta$. Thus, by using this approximation, $\theta_{Bank}$ can be expressed in the following equation (6). From the equation (6), the slope angle $\theta_{Bank}$ can be obtained. In this case, it can be said that the slope estimator 242 uses the equation (6) to estimate the degree of sloping based on the lateral acceleration $G_{ySens}$ detected by the lateral acceleration sensor 180 and the centripetal acceleration Ay ($=\gamma \cdot Vx$).

$$\theta_{Bank}=(G_{ySens}-\gamma \cdot Vx)/G \quad (6)$$

At this time, the slope estimator 242 may also correct a difference in the lateral height of the vehicle, which is caused by the slope in the transverse direction of the roadway and/or traveling of the vehicle. In other words, if the roadway is sloped as described above, the vehicle will lean in the right-left direction according to the slope of the roadway, resulting in the difference in the height of the vehicle in the right-left direction. Also, if the roadway is curved, the vehicle will experience roll, resulting in the vehicle body leaning and the difference in the height of the vehicle in the right-left direction as well. The slope estimator 242 further takes such leaning of the vehicle into account and corrects the lateral height difference of the vehicle to determine the slope angle $\theta_{Bank}$. This further improves the accuracy of the estimated slope angle $\theta_{Bank}$.

Figure 7:
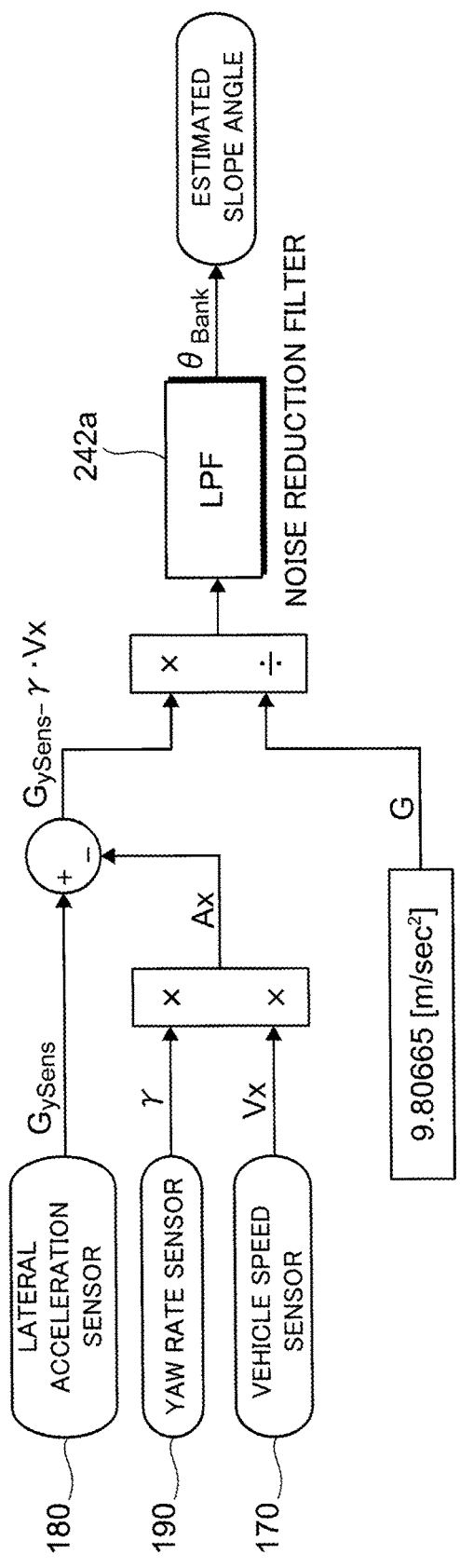
FIG. 7 is a control block diagram illustrating a process performed by a slope estimator.

FIG. 7 is a control block diagram illustrating a process performed by the slope estimator 242.

The slope estimator 242 determines the centripetal acceleration Ay from the yaw rate γ, which is identified from the yaw rate signal γs obtained from the yaw rate sensor 190, and the vehicle speed Vx, which is identified from the vehicle speed signal v obtained from the vehicle speed sensor 170, according to the equation (1). Further, the slope estimator 242 determines $G_{ySens}-\gamma \cdot Vx$ in the equation (6) from the lateral acceleration $G_{ySens}$, which is identified from the lateral acceleration signal Gy obtained from the lateral acceleration sensor 180. The slope estimator 242 then uses the gravitational acceleration G to determine the slope angle $\theta_{Bank}$ according to the equation (6). At this time, a noise reduction filter 242a as a low-pass filter (LPF) is used to remove high-frequency components. Specifically, any slope angle $\theta_{Bank}$ that is created by irregularities in the road surface of the roadway etc. and pseudo in nature is removed. That is, any slope angle $\theta_{Bank}$ obtained from irregularities in the road surface of the roadway etc. changes frequently, and any slope angle $\theta_{Bank}$ resulting from such changes is considered to have a high-frequency component. On the other hand, any slope angle $\theta_{Bank}$ obtained from the actual slope does not change frequently and is considered to have a low-frequency component. Accordingly, high-frequency components are removed while leaving low-frequency components to leave the slope angle $\theta_{Bank}$ obtained from such low-frequency components.

Returning to FIG. 4, the correction current determiner 243 determines, based on the estimated degree of sloping, a correction current Ia to correct the target current required for the electric motor 110 to generate an assist force. Specifically, if the roadway is sloped in the transverse direction, the vehicle will tend to go to the lower side of the roadway as it travels on the roadway due to the effect of gravity. This phenomenon is also called vehicle body drifting. To cope with this, the driver will operate the steering wheel 101 to move the vehicle toward the higher side of the roadway. In other words, with respect to the right-left direction of the vehicle, the driver will operate the steering wheel 101 to move the vehicle in the direction opposite the direction in which the roadway is sloping downward. At this time, the correction current determiner 243 determines a correction current Ia to generate an assist force to assist this operation by the driver.

Figure 8:
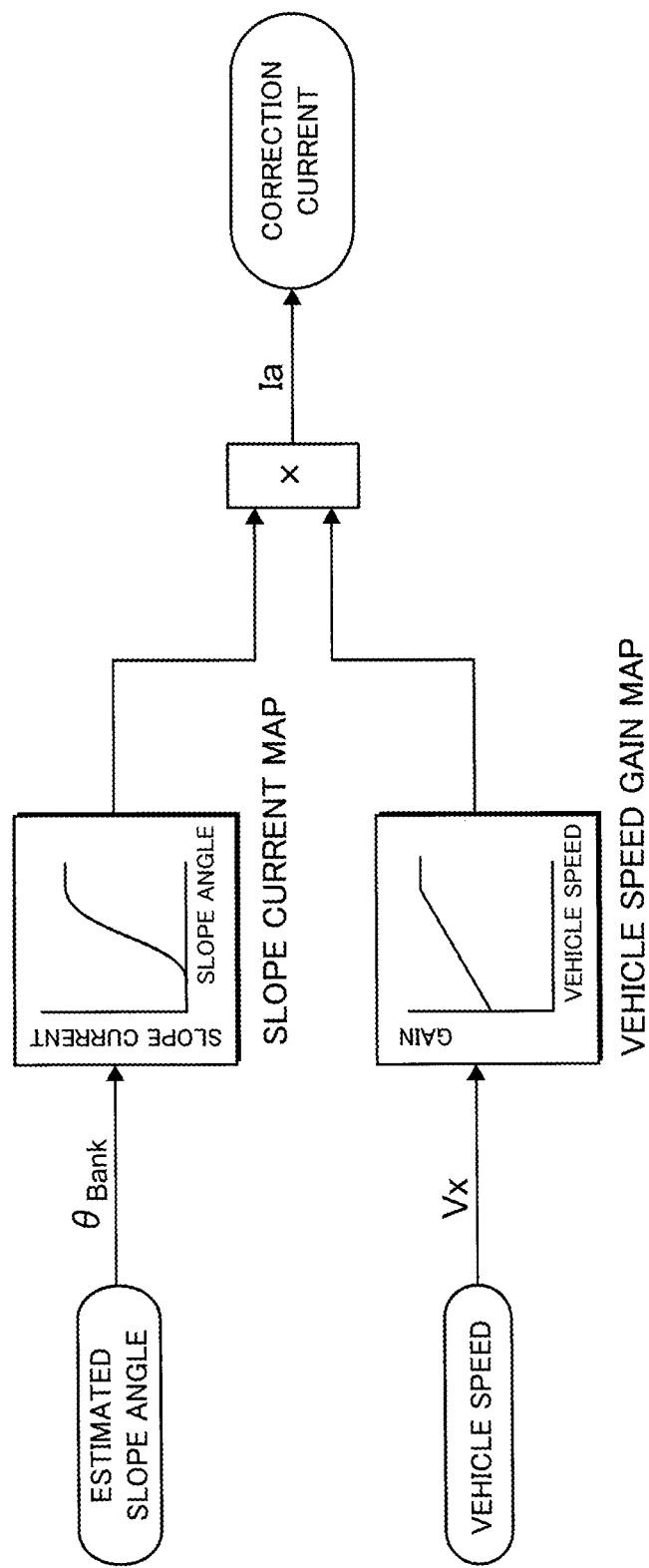
FIG. 8 is a control block diagram illustrating a process performed by a correction current determiner.

FIG. 8 is a control block diagram illustrating a process performed by the correction current determiner 243.

The correction current determiner 243 calculates a slope current by populating a slope current map with the slope angle $\theta_{Bank}$. The slope current map defines relationship between the $\theta_{Bank}$ and the slope current. The slope current map may be empirically created and stored in the ROM in advance. Meanwhile, the correction current determiner 243 calculates a vehicle speed gain by populating a vehicle speed gain map with the vehicle speed Vx. The vehicle speed gain map defines relationship between the vehicle speed Vx and the vehicle speed gain. The vehicle speed gain map may be empirically created and stored in the ROM in advance. A larger vehicle speed Vx corresponds to a larger vehicle speed gain, and once the vehicle speed Vx exceeds a predetermined vehicle speed Vx, the vehicle speed gain becomes constant. The correction current determiner 243 then multiplies the slope current by the vehicle speed gain to determine the correction current Ia.

Returning to FIG. 4 again, the correction current outputter 244 outputs the correction current Ia determined by the correction current determiner 243 to the target current determiner 25.

Subsequently, the target current determiner 25 corrects the target current based on the correction current Ia output from the correction current outputter 244 to determine the final target current It.

Figure 9:
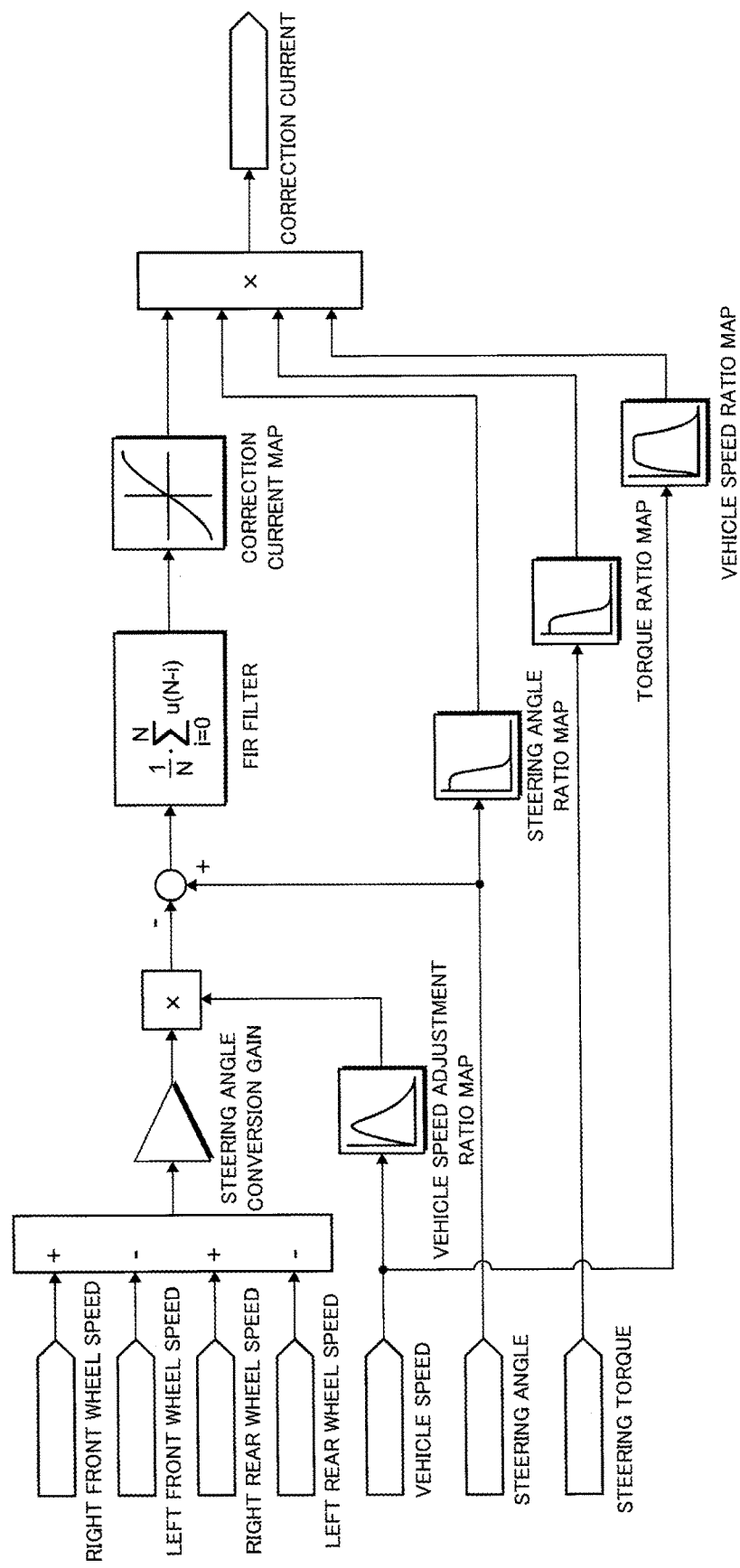
FIG. 9 is a control block diagram illustrating a process conventionally performed by the correction current determiner.

FIG. 9 is a control block diagram illustrating a process conventionally performed by the correction current determiner 243.

The correction current determiner 243 receives a right front wheel speed, a left front wheel speed, a right rear wheel speed, a left rear wheel speed, the vehicle speed Vx, a steering angle of the steering wheel 101, and steering torque that is applied to the steering wheel 101 as the driver operates the steering wheel 101. The correction current determiner 243 determines a steering angle conversion gain from the right front wheel speed, the left front wheel speed, the right rear wheel speed, and the left rear wheel speed. Also, from the vehicle speed Vx, the correction current determiner 243 determines a vehicle speed adjustment ratio using a vehicle speed adjustment ratio map, and determines a vehicle speed ratio using a vehicle speed ratio map. Further, the correction current determiner 243 determines a steering angle ratio from the steering angle using a steering angle ratio map. Still further, the correction current determiner 243 determines a torque ratio from the steering torque using a torque ratio map. The correction current determiner 243 then adjusts the steering angle conversion gain by the vehicle speed adjustment ratio, and calculates a provisional correction current using a correction current map. The correction current determiner 243 then adjusts the provisional correction current by the steering angle ratio, the torque ratio, and the vehicle speed ratio to determine the final correction current.

In other words, the vehicle speed adjustment ratio, the steering angle ratio, the torque ratio, and the vehicle speed ratio are adjustment terms. In this case, in the conventional approach, if the vehicle comes into an extraordinary state, such as when the vehicle is making a sharp turn, the logic for determining the correction current cannot be met any more, and thus such many adjustment terms are used to impose restrictions in determining the correction current. However, providing restrictions by many adjustment terms in this manner often render the assist force discontinuous, which may worsen the steering feel for the driver.

In the present embodiment, the slope angle $\theta_{Bank}$ is calculated from the state quantities of the vehicle, and the correction current Ia is determined from the slope angle $\theta_{Bank}$. In this case, the state quantities of the vehicle include the vehicle speed Vx, the lateral acceleration $G_{ySens}$, and the yaw rate γ as described above. Using the state quantities of the vehicle in this manner eliminates the need for the adjustment terms described above, so that the assist force is less likely to be discontinuous. This facilitates improving the steering feel for the driver.

In the present embodiment, the slope angle $\theta_{Bank}$ is determined, and the correction current Ia is determined therefrom. As such, it is possible to determine the correction current Ia that more directly takes into account the vehicle body drifting caused by the slope angle $\theta_{Bank}$. This facilitates further improving the steering feel for the driver. Additionally, the process of calculating the correction current Ia from the slope angle $\theta_{Bank}$ performed by the correction current determiner 243 is not complicated. Further, the present embodiment uses the vehicle speed Vx, rather than parameters sensitive to road surface irregularities such as the right front wheel speed, the left front wheel speed, the right rear wheel speed, and the left rear wheel speed, and thus can make the calculation of the correction current Ia less sensitive to road surface irregularities. That is, the vehicle speed Vx is an average quantity of the right front wheel speed, the left front wheel speed, the right rear wheel speed, and the left rear wheel speed and is thus less sensitive to road surface irregularities. Also, the present embodiment can avoid a drop in robustness due to slippage of the wheels 150 or other events.

The present embodiment does not use parameters (such as the steering torque) that are sensitive to inertia, damping, friction, and other factors inside the steering wheel 101. This further improves the accuracy of the correction current Ia.

Second Embodiment

A second embodiment is now described. In the second embodiment, the control device 10 changes the above control depending on conditions of the roadway surface.

Figure 10:
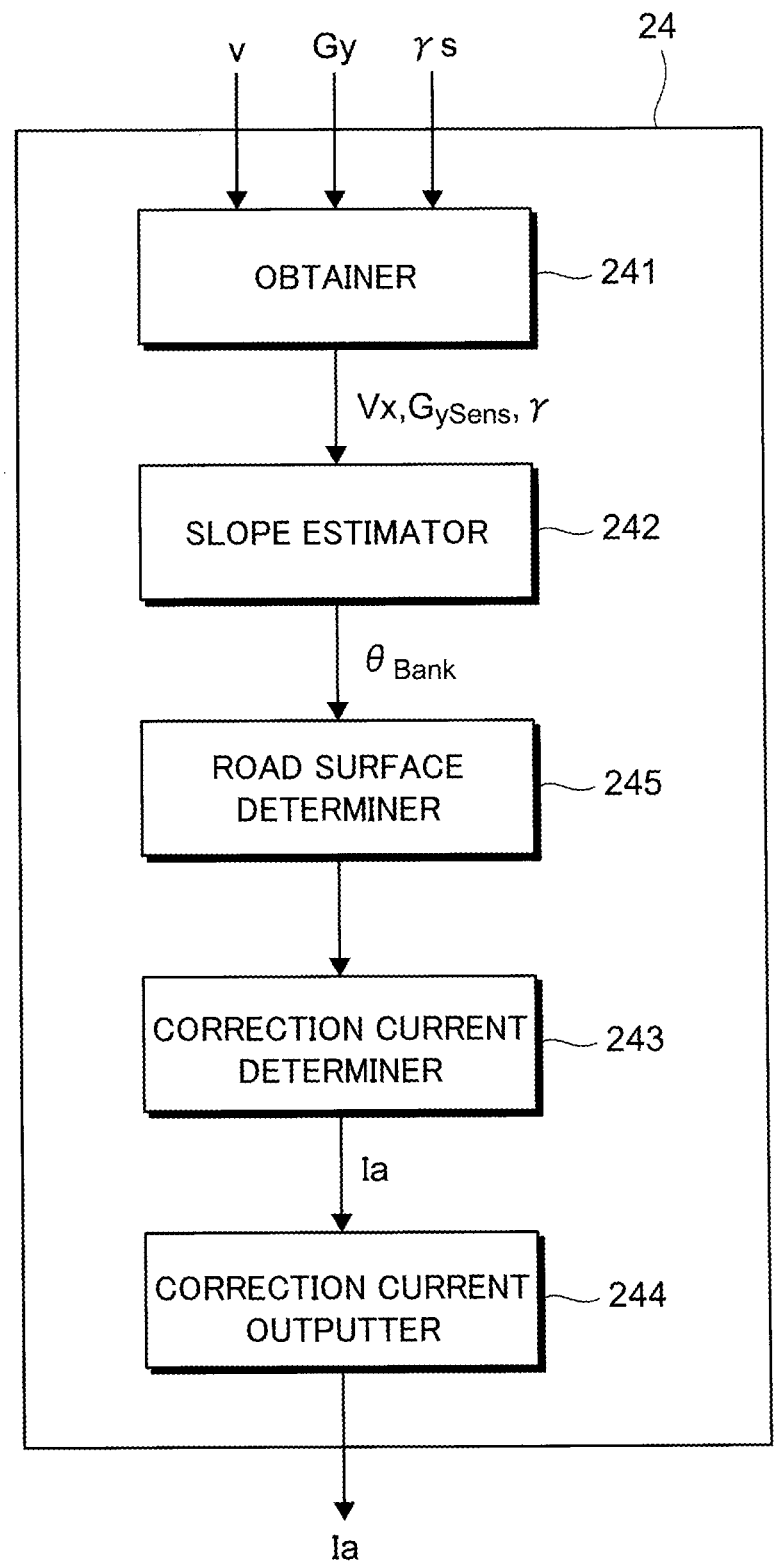
FIG. 10 is a block diagram illustrating an example functional configuration of the correction current calculator of a second embodiment.

FIG. 10 is a block diagram illustrating an example functional configuration of the correction current calculator 24 of the second embodiment.

The correction current calculator 24 as shown differs from the first embodiment shown in FIG. 4 in that the correction current calculator 24 of the second embodiment includes a road surface determiner 245, and is otherwise identical to the first embodiment.

Accordingly, the following description will focus on the functions of the road surface determiner 245.

The road surface determiner 245 determines conditions of the road surface of the roadway. Specifically, the road surface determiner 245 determines whether the road surface of the roadway is paved or unpaved (off-road). In response to the road surface determiner 245 determining that the road surface is paved, the drive of the electric motor 110 is controlled according to the degree of sloping, as in the first embodiment. That is, the correction current determiner 243 determines the correction current Ia according to the degree of sloping. On the other hand, if the road surface is unpaved, this control is not performed. In this case, the correction current determiner 243 sets the vehicle speed gain shown in FIG. 8 to 0 to thereby set the correction current Ia to 0. In other words, the target current is not corrected by the target current determiner 25.

The road surface determiner 245 determines the conditions of the roadway surface in the following manner, for example.

The road surface determiner 245 obtains differential values for the slope angle $\theta_{Bank}$. And the road surface determiner 245 counts the number of times where this slope angle $\theta_{Bank}$ is greater than a predetermined first threshold. In response to the count exceeding a second threshold during a unit of time, the road surface determiner 245 determines that the roadway is unpaved (off-road). If the count does not exceed the second threshold during the unit of time, the road surface determiner 245 determines that the roadway is paved.

That is, the vehicle is more shaken sideways when it drives on unpaved roads (off-road), which causes large fluctuations in the calculated slope angle $\theta_{Bank}$. Thus, the road surface determiner 245 uses the first threshold to detect when the slope angle $\theta_{Bank}$ undergoes large fluctuations. Further, the road surface determiner 245 uses the second threshold to determine, in response to such large fluctuations occurring frequently, that the roadway is unpaved (off-road).

Figure 11:
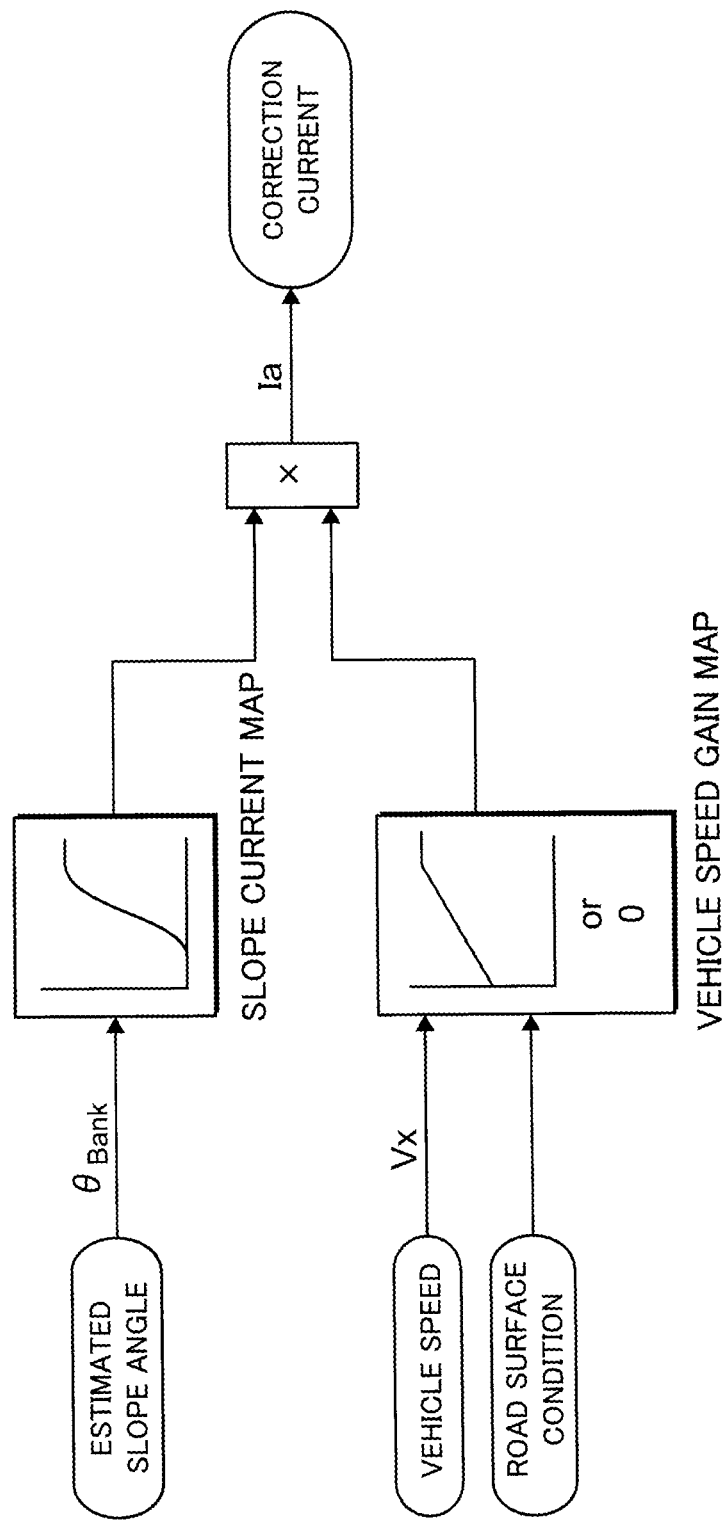
FIG. 11 is a control block diagram illustrating a process performed by the correction current determiner in the second embodiment.

FIG. 11 is a control block diagram illustrating a process performed by the correction current determiner 243 in the second embodiment.

The control block diagram shown in FIG. 11 differs from the control block diagram shown in FIG. 8 in that the road surface conditions output from the road surface determiner 245 are input. If the road surface conditions indicate paved roads, the correction current determiner 243 populates the vehicle speed gain map with the vehicle speed Vx to calculate the vehicle speed gain, as in the first embodiment. On the other hand, if the road surface conditions indicate unpaved roads (off-road), the vehicle speed gain map is not used and the vehicle speed vain is 0. Accordingly, the correction current Ia is 0.

In this case, the vehicle is, for example, an off-road vehicle. As the off-road vehicle travels on unpaved roads (off-road) such as on grass, sand, mud, or rocky terrain, the off-road vehicle may lean sideways due to surface irregularities, obstacles, puddles, etc., which may result in the slope angle $\theta_{Bank}$ being calculated due to such leaning. In such cases, performing the correction described above may generate an assist force that is contrary to the driver's intention. That is, during driving on unpaved roads (off-road), the driver is required to drive flexibly according to the road surface conditions. Performing the above correction during such driving would provide a correction that is non-essential in nature, which tends to worsen the steering feel for the driver. In such cases, during driving on unpaved roads (off-road), the correction current Ia is set to 0 to make no correction to the target current, which facilitates improving the steering feel for the driver. Additionally, this does not affect the driver's excitement associated with driving off-road.

Third Embodiment

Now a third embodiment is described. In the third embodiment, the correction current Ia is calculated by further taking into account an axial load experienced by the rack shaft 105 (see FIG. 1) due to the slope in the transverse direction of the roadway. The axial load on the rack shaft 105 is a load applied in the axial direction of the rack shaft 105 due to the presence of the slope.

An example functional configuration of the correction current calculator 24 of the third embodiment is similar to that of the first embodiment shown in FIG. 4.

Figure 12:
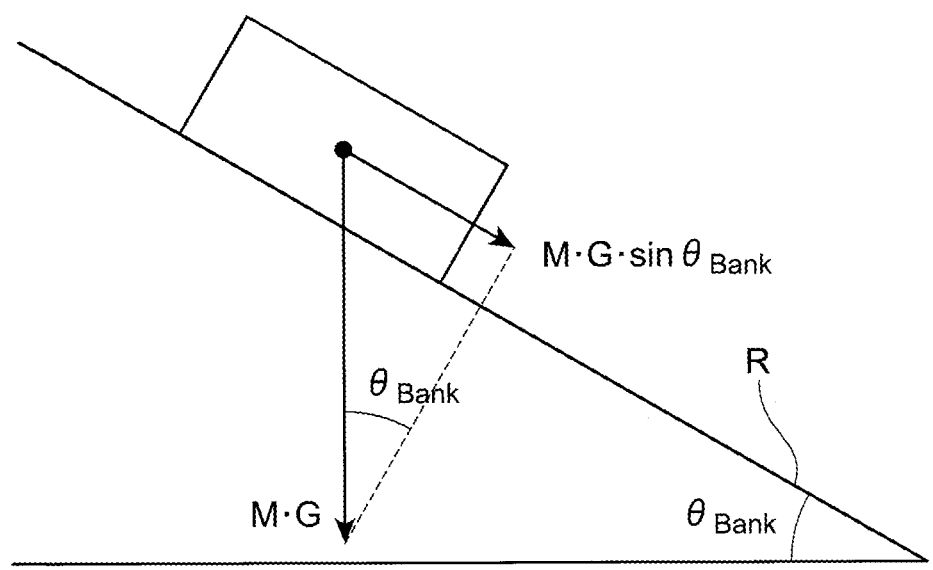
FIG. 12 explains an axial load experienced by a rack shaft due to a slope in the transverse direction of the roadway.

FIG. 12 explains the axial load experienced by the rack shaft 105 due to the slope in the transverse direction of the roadway.

The figure schematically shows the vehicle S traveling on a roadway with a slope angle $\theta_{Bank}$. With a weight M of the vehicle S, a force of $M \cdot G \cdot \sin \theta_{Bank}$ is applied to the vehicle S in the direction along the road surface R of the roadway. This force acts as an axial load experienced by the rack shaft 105.

A method of calculating the axial load experienced by the rack shaft 105 is described below.

Figure 13:
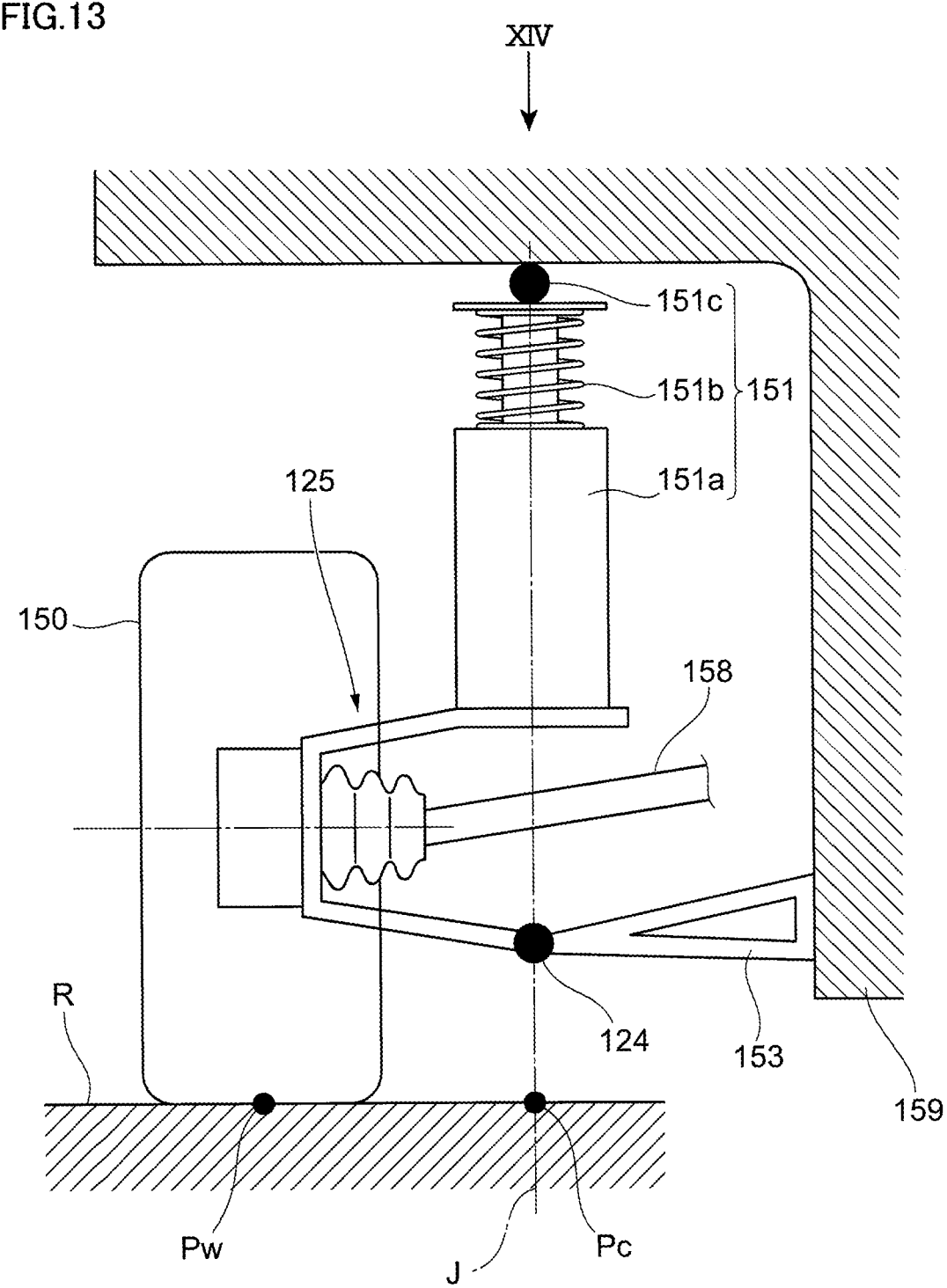
FIG. 13 illustrates an arrangement around a wheel.
Figure 14:
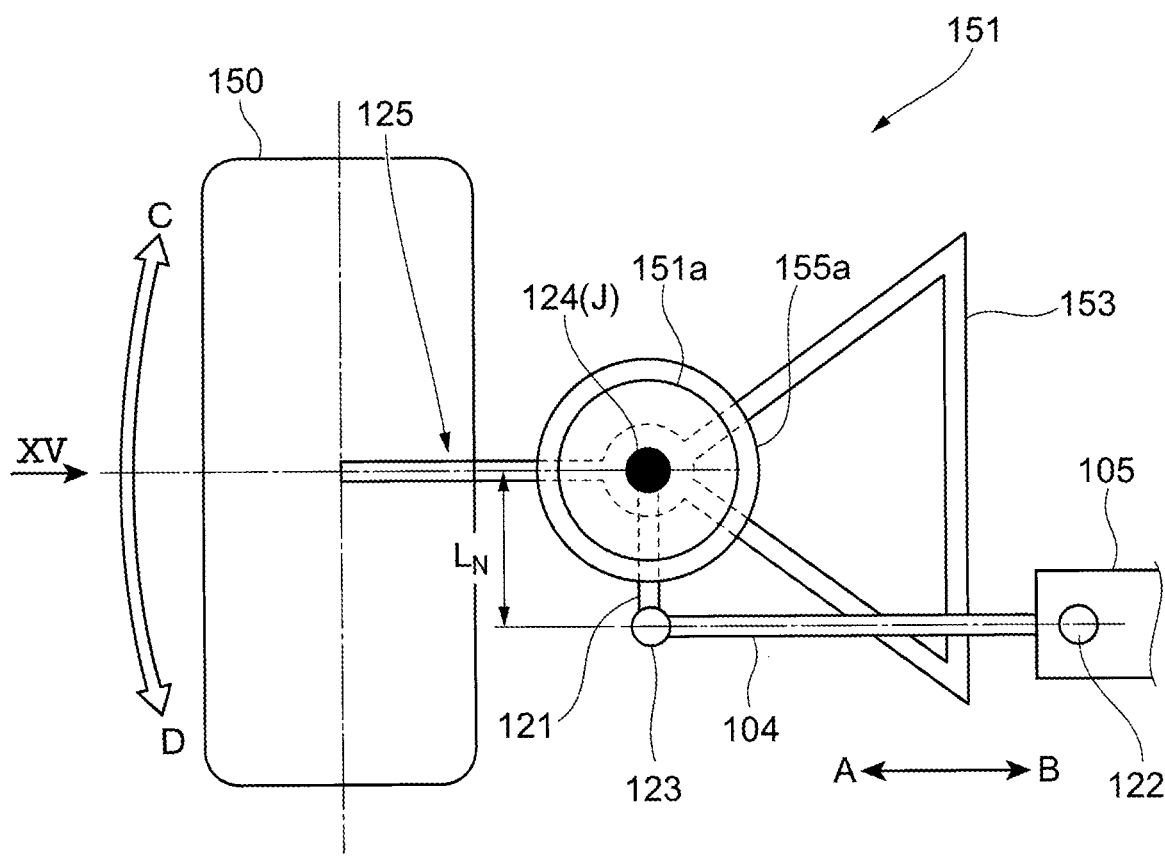
FIG. 14 illustrates an arrangement around the wheel.
Figure 15:
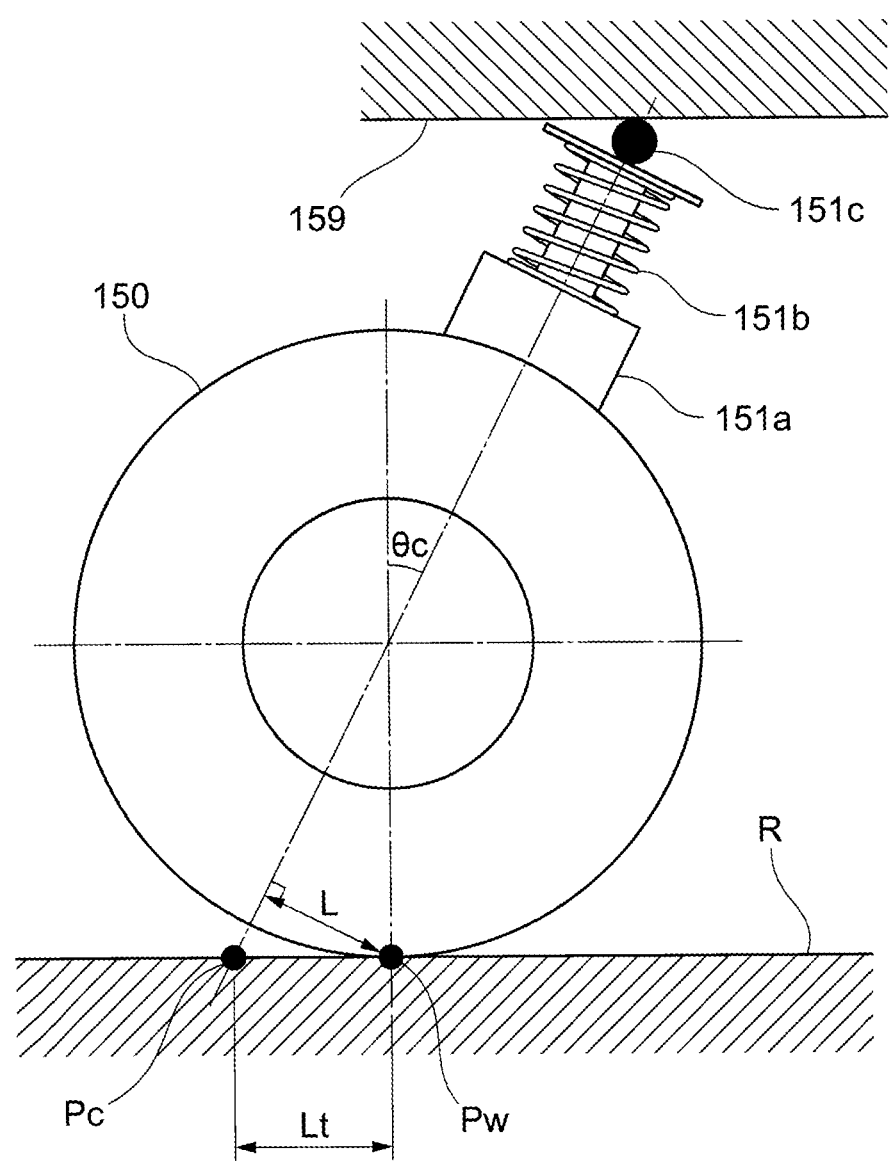
FIG. 15 explains a trail length.

FIGS. 13 and 14 illustrate an arrangement around a wheel. FIG. 15 explains a trail length Lt.

FIG. 13 illustrates portions around the wheel 150 as viewed in the direction of XIII in FIG. 1, showing a horizontal view of the portions around the wheel 150.

FIG. 14 illustrates the portions around the wheel 150 as viewed in the direction of XIV in FIG. 13, showing a vertical view of the portions around the wheel 150. In other words, FIG. 14 illustrates the portions around the wheel 150 as viewed in the same direction as FIG. 1.

FIG. 15 illustrates the wheel 150 as viewed in the direction of XV in FIG. 14.

As shown in FIGS. 13 and 14, a drive shaft 158 is connected to each wheel 150 to transmit power for the vehicle to travel from a power source, such as an engine. In other words, a rotational force is transmitted from the drive shaft 158 to each wheel 150, whereby the wheels 150 rotate to cause the vehicle to travel. Also, the wheel 150 is connected to a body 159 via the steering knuckle 125 and a lower arm 153. The kingpin 124 provides a joint between the steering knuckle 125 and the lower arm 153. The steering knuckle 125 is connected to the body 159 via a shock absorber 151. The shock absorber 151 includes a damper 151a and a coil spring 151b and is connected to the body 159 at a ball bearing 151c provided at its top portion. The shock absorber 151 allows the vehicle to absorb shocks from irregularities in the road surface.

Also, when the rack shaft 105 is moved in the direction of the arrow A, the knuckle arm 121 and the steering knuckle 125 rotate around the kingpin 124, causing the wheel 150 to be steered in the direction of the arrow C. When the rack shaft 105 is moved in the direction of the arrow B, the knuckle arm 121 and the steering knuckle 125 rotate in the opposite direction around the kingpin 124, causing the wheel 150 to be steered in the direction of the arrow D.

Here, we consider an axis connecting the ball bearing 151c and the kingpin 124, and define this as a kingpin axis J. Additionally, as shown in FIG. 15, a point where the kingpin axis J intersects the road surface R is defined as point Pc, and a point where the wheel 150 contacts the road surface R is defined as point Pw. The distance between the point Pc and the point Pw is defined as a trail length Lt. The distance between the kingpin axis J and the contact point Pw is defined as L. The distance L is predetermined from the trail length Lt and a caster angle $\theta c$. The distance L may also be referred to as the distance between the center of the kingpin 124 and the point where the wheel 150 contacts the road surface.

The length of the knuckle arm 121 is defined as a knuckle arm length $L_N$. The knuckle arm length $L_N$ may also be referred to as the distance between the center of the joint 123 and the center of the kingpin 124.

With a given weight $M_f$ of the vehicle that the front wheel bears, the axial load $F_{G\theta}$ experienced by the rack shaft 105 due to the slope in the transverse direction of the roadway can be expressed in the following equation (7).

$$F_{G\theta} = (L \cdot M_f \cdot G \cdot \sin \theta_{Bank})/L_N \qquad (7)$$

Figure 16:
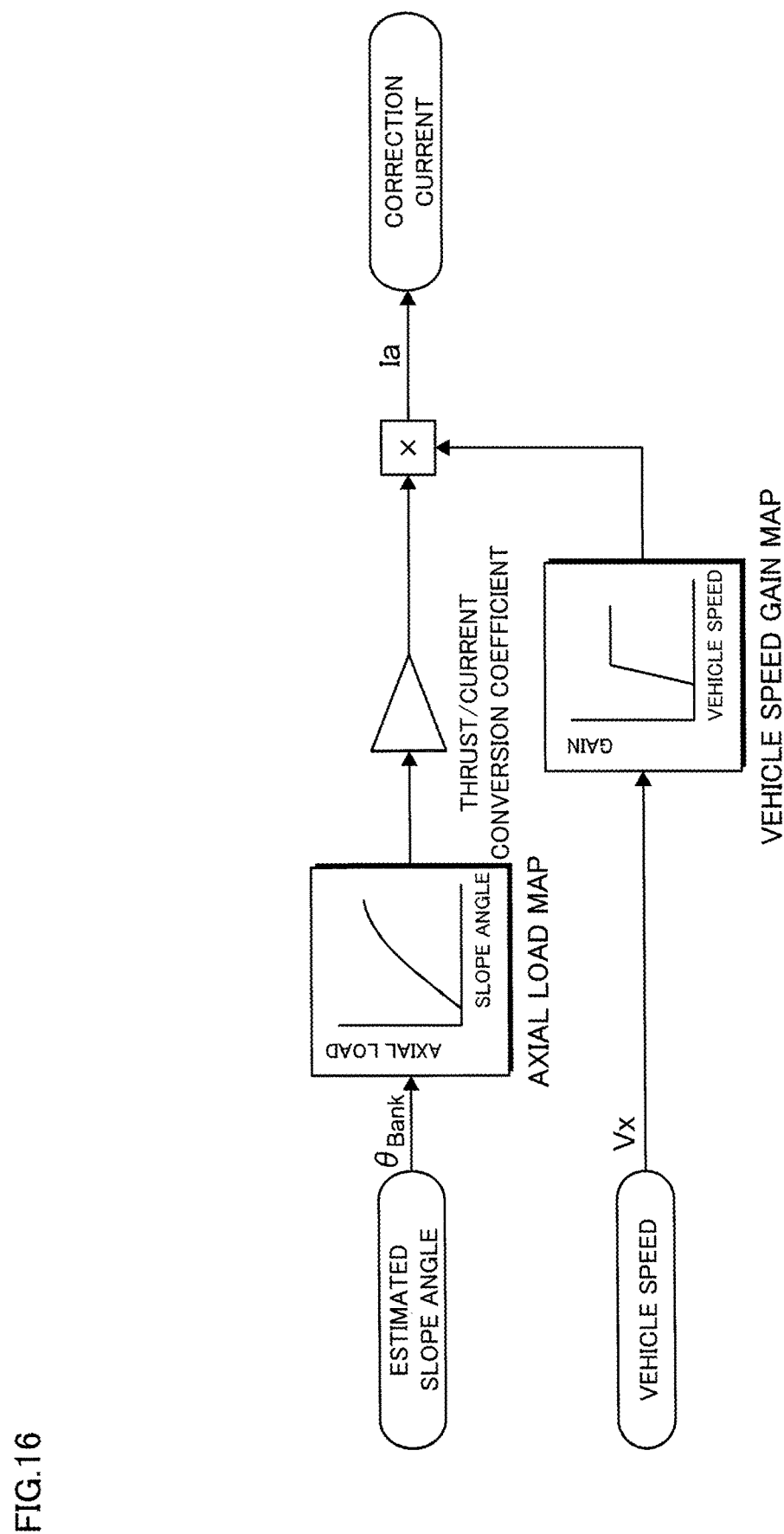
FIG. 16 is a control block diagram illustrating a process performed by the correction current determiner in a third embodiment.

FIG. 16 is a control block diagram illustrating a process performed by the correction current determiner 243 in the third embodiment.

The control block diagram shown in FIG. 16 differs from the control block diagram shown in FIG. 8 in that the axial load map replaces the slope current map. The axial load map is a map defining correspondence between the slope angle $\theta_{Bank}$ and the axial load $F_{G\theta}$. The axial load map may be empirically created and stored in the ROM in advance. The axial load $F_{G\theta}$ can be determined by populating the axial load map with the slope angle $\theta_{Bank}$. As shown in the figure, the axial load map includes a slope angle dead zone, so that the axial load $F_{G\theta}$ is 0 in the region where the slope angle is small. Consequently, the correction current Ia calculated by the correction current determiner 243 is 0. This is because in the region where the slope angle is small, the axial load $F_{G\theta}$ is small, and thus there will be no problem with setting the calculated correction current Ia to 0.

The correction current determiner 243 then converts the axial load $F_{G\theta}$ into a current using a thrust/current conversion coefficient. Further, the correction current determiner 243 multiplies the converted current by the vehicle speed gain to determine the correction current Ia.

As shown in the figure, the vehicle speed gain map used herein provides a 0 gain in a predetermined low speed range. In this case, the correction current Ia is 0. The low speed range is where the vehicle speed Vx is from 0 km/h to 60 km/h, for example. The gain increases with an increase in the vehicle speed in a predetermined medium speed range. The medium speed range is where the vehicle speed Vx is from 60 km/h to 80 km/h, for example. The gain is constant regardless of the vehicle speed in a predetermined high speed range. The high speed range is where the vehicle speed Vx is 80 km/h or higher, for example. That is, since the axial load $F_{G\theta}$ becomes problematic when the vehicle speed is at or above a predetermined speed, there will be no problem with setting the correction current Ia, as calculated by the correction current determiner 243, to 0 in the low speed range. On the other hand, the correction current determiner 243 calculates the correction current Ia according to the axial load $F_{G\theta}$ in the medium or higher speed range.

In the third embodiment, the correction current Ia is calculated by further taking into account the axial load $F_{G\theta}$ experienced by the rack shaft 105 due to the slope in the transverse direction of the roadway. The axial load $F_{G\theta}$ experienced by the rack shaft 105 is calculated by taking into account the alignment of the wheel 150. In this case, the correction current determiner 243 uses the knuckle arm length $L_N$ and the trail length Lt to calculate the axial load $F_{G\theta}$. This further improves the accuracy of the correction current Ia.

<Description of Program>

The processes of the control device 10 in the present embodiments are implemented as software and hardware resources work together. Specifically, a CPU (not shown) in the control device 10 executes a program for implementing the functions of the control device 10 and thus implements the functions.

Accordingly, the processes of the control device 10 may be construed as a program that causes a computer to implement the functions of: estimating a degree of sloping in a transverse direction of a roadway on which a vehicle travels; determining, based on the estimated degree of sloping, a correction current Ia to correct a target current required for the electric motor 110 to generate a driving force; and determining the target current based on the determined correction current Ia.

The program for implementing the present embodiments may be provided in the form of a recording medium, such as a CD-ROM, as well as being provided via a communication means.

The present embodiments have been described above, but the technical scope of the present invention is not limited to the scope described in the above embodiments. From the appended claims, it will be obvious to those skilled in the art that various modifications and improvements made to the above embodiments are also within the technical scope of the present invention.

REFERENCE SIGNS LIST

10 Control device
20 Target current calculator
24 Correction current calculator
30 Controller
100 Electric power steering device
101 Steering wheel
110 Electric motor
105 Rack shaft
121 Knuckle arm
124 Kingpin
150 Wheel
170 Vehicle speed sensor
180 Lateral acceleration sensor
190 Yaw rate sensor
241 Obtainer
242 Slope estimator
243 Correction current determiner
244 Correction current outputter
245 Road surface determiner
R Road surface
S Vehicle

The invention claimed is:

1. An electric power steering device comprising:
an electric motor configured to apply a driving force to steer a wheel in response to operation of a steering wheel; and
a control unit configured to perform control of drive of the electric motor by estimating a degree of sloping in a transverse direction of a roadway on which a vehicle travels, determining, based on the estimated degree of sloping, a correction current for correcting a target current required for the electric motor to generate the driving force, and correcting the target current with the correction current, wherein
the control unit is configured to:
determine conditions of a road surface of the roadway and change the control according to the determined conditions of the road surface; and
perform the control when the road surface is paved, and not to perform the control in response to determining that the road surface is unpaved when a number of times where a differential value for an indicator representing the degree of sloping is greater than a predetermined first threshold exceeds a second threshold during a unit of time.

2. The electric power steering device according to claim 1, wherein the control unit is configured to determine a slope current using a slope current map defining correspondence between the estimated degree of sloping and a slope current, and determine the correction current by multiplying the slope current by a vehicle speed gain determined by a vehicle speed.

3. The electric power steering device according to claim 2, wherein the control unit is configured to perform the control by correcting a difference in a lateral height of the vehicle caused by a slope in the transverse direction of the roadway and/or traveling of the vehicle.

4. The electric power steering device according to claim 1, wherein the control unit is configured to estimate the degree of sloping based on lateral acceleration detected by a lateral acceleration sensor and centripetal acceleration calculated from a yaw rate acting on the vehicle and a vehicle speed.

5. The electric power steering device according to claim 4, wherein the control unit is configured to perform the control by correcting a difference in a lateral height of the vehicle caused by a slope in the transverse direction of the roadway and/or traveling of the vehicle.

6. The electric power steering device according to claim 1, wherein the control unit is configured to perform the control by correcting a difference in a lateral height of the vehicle caused by a slope in the transverse direction of the roadway and/or traveling of the vehicle.

7. The electric power steering device according to claim 1, wherein
the electric motor is configured to apply the driving force via a rack shaft, and
the control unit is configured to perform the control by taking into account an axial load that is experienced by the rack shaft due to a slope in the transverse direction of the roadway.

8. The electric power steering device according to claim 7, wherein the control unit is configured to calculate the axial load by using a knuckle arm length and a distance between a center of a kingpin and a point where the wheel contacts a road surface.

9. A control device for an electric power steering device, the control device comprising:
- a slope estimator configured to estimate a degree of sloping in a transverse direction of a roadway on which a vehicle travels;
- a road surface determiner configured to determine conditions of a road surface of the roadway;
- a correction current determiner configured to determine, based on the conditions of the road surface of the roadway determined by the road surface determiner and the estimated degree of sloping, a correction current for correcting a target current required for an electric motor to generate a driving force; and
- a target current determiner configured to determine the target current based on the determined correction current, wherein
- the road surface determiner is configured to determine that the road surface is unpaved when a number of times where a differential value for an indicator representing the degree of sloping is greater than a predetermined first threshold exceeds a second threshold during a unit of time, and determine that the road surface is paved when the number of times does not exceed the second threshold during the unit of time, and
- the correction current determiner is configured to determine the correction current based on the estimated degree of sloping when the road surface is paved, and set the correction current to 0 when the road surface is unpaved.

* * * * *